March 29, 1960   H. E. ERICKSON ET AL   2,930,474
MAT HANDLING METHOD AND APPARATUS
Original Filed March 21, 1957   5 Sheets-Sheet 1

INVENTORS
HAROLD E. ERICKSON
NORMAN E. NELSON
BY CHARLES V. NELSON
DALE L. SCHUBERT
Eugene P. Farley
ATTY.

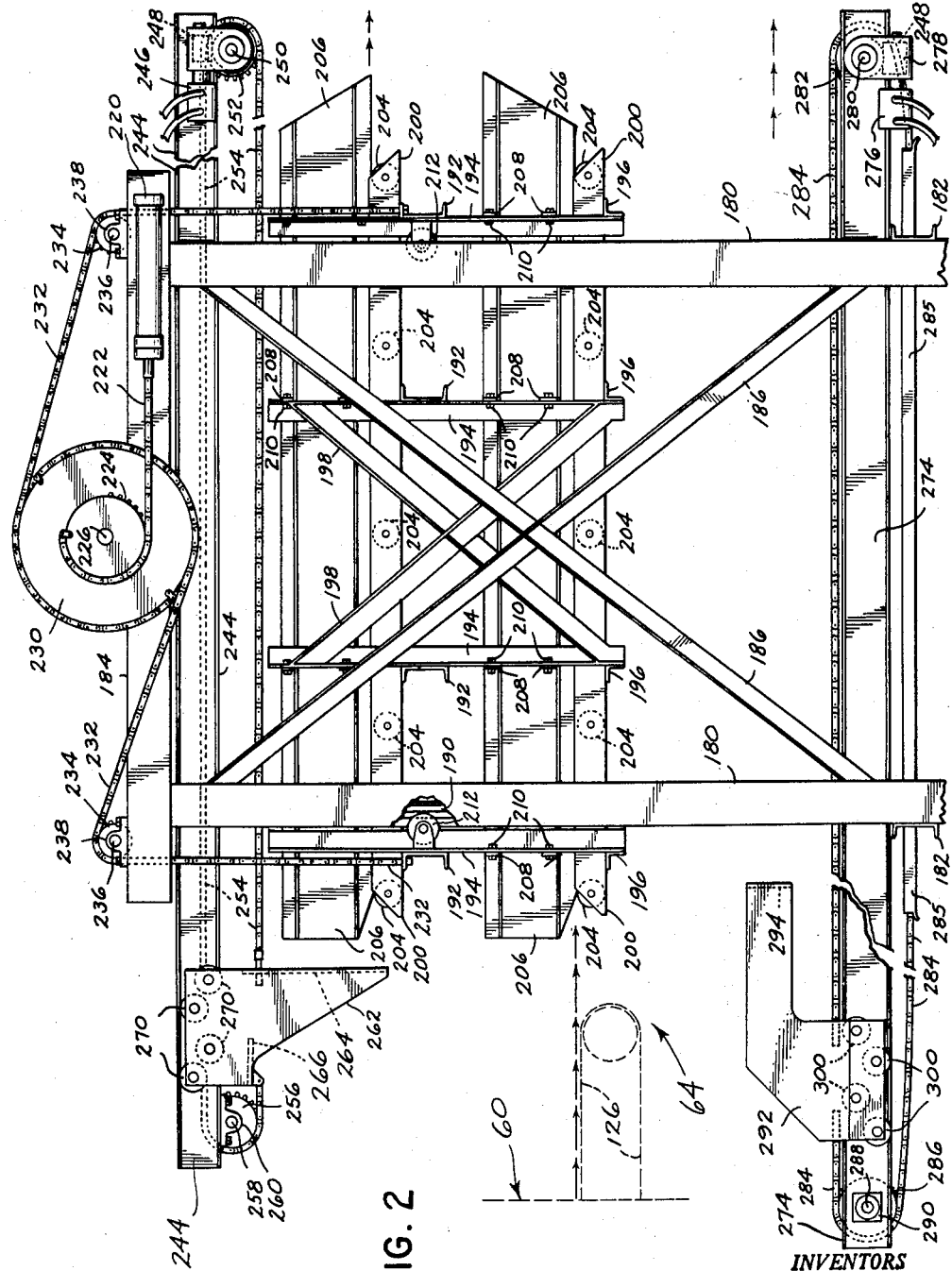

March 29, 1960 H. E. ERICKSON ET AL 2,930,474
MAT HANDLING METHOD AND APPARATUS
Original Filed March 21, 1957 5 Sheets-Sheet 3
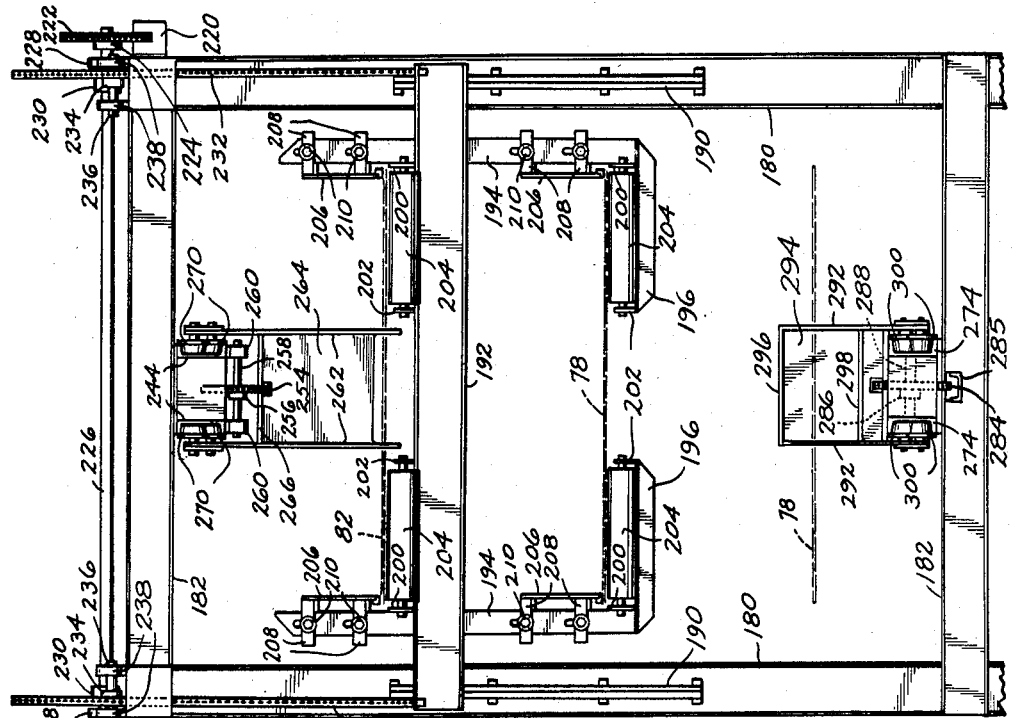
INVENTORS
HAROLD E. ERICKSON
NORMAN E. NELSON
BY CHARLES V. NELSON
DALE L. SCHUBERT
ATTY.

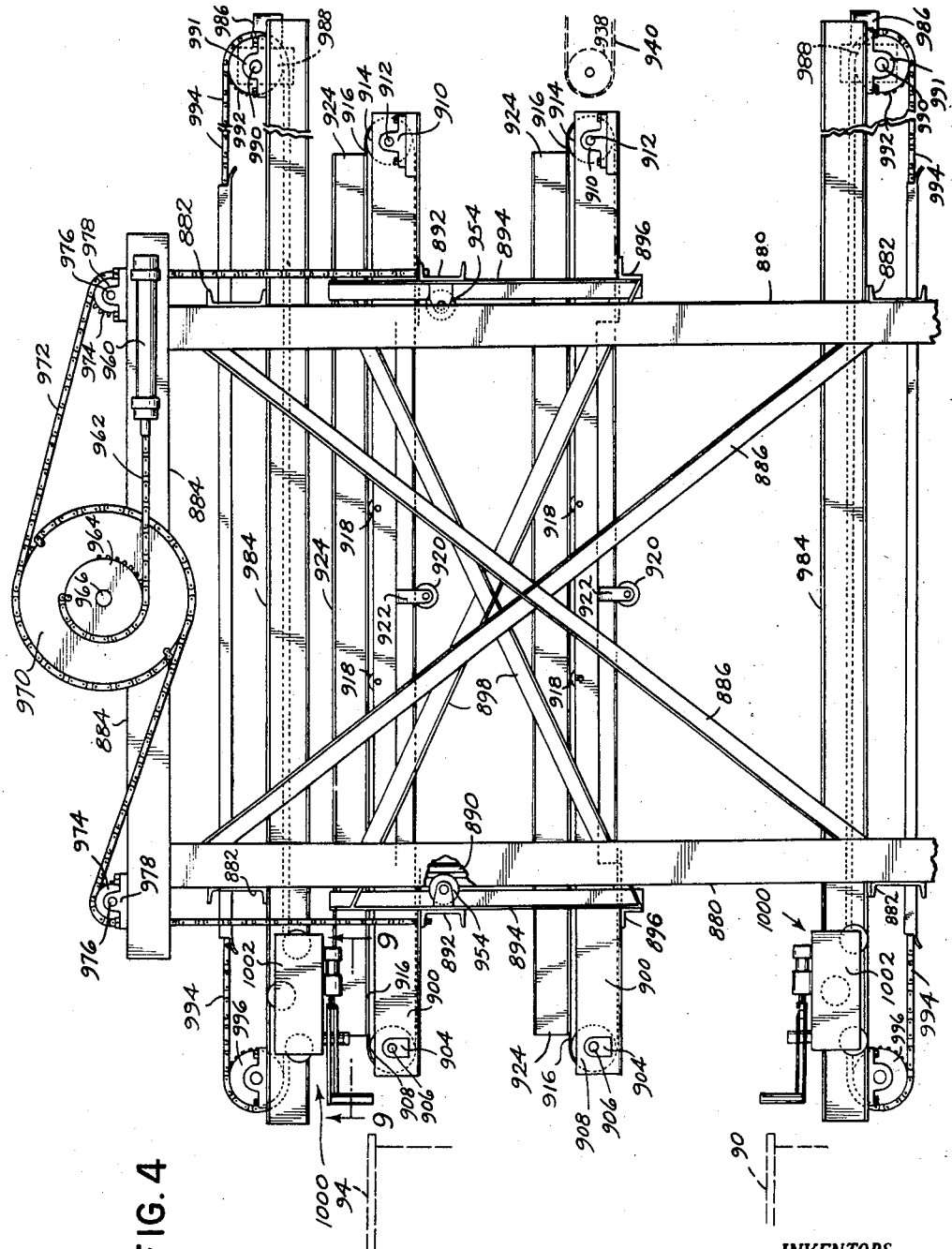

March 29, 1960 H. E. ERICKSON ET AL 2,930,474
MAT HANDLING METHOD AND APPARATUS
Original Filed March 21, 1957 5 Sheets-Sheet 5
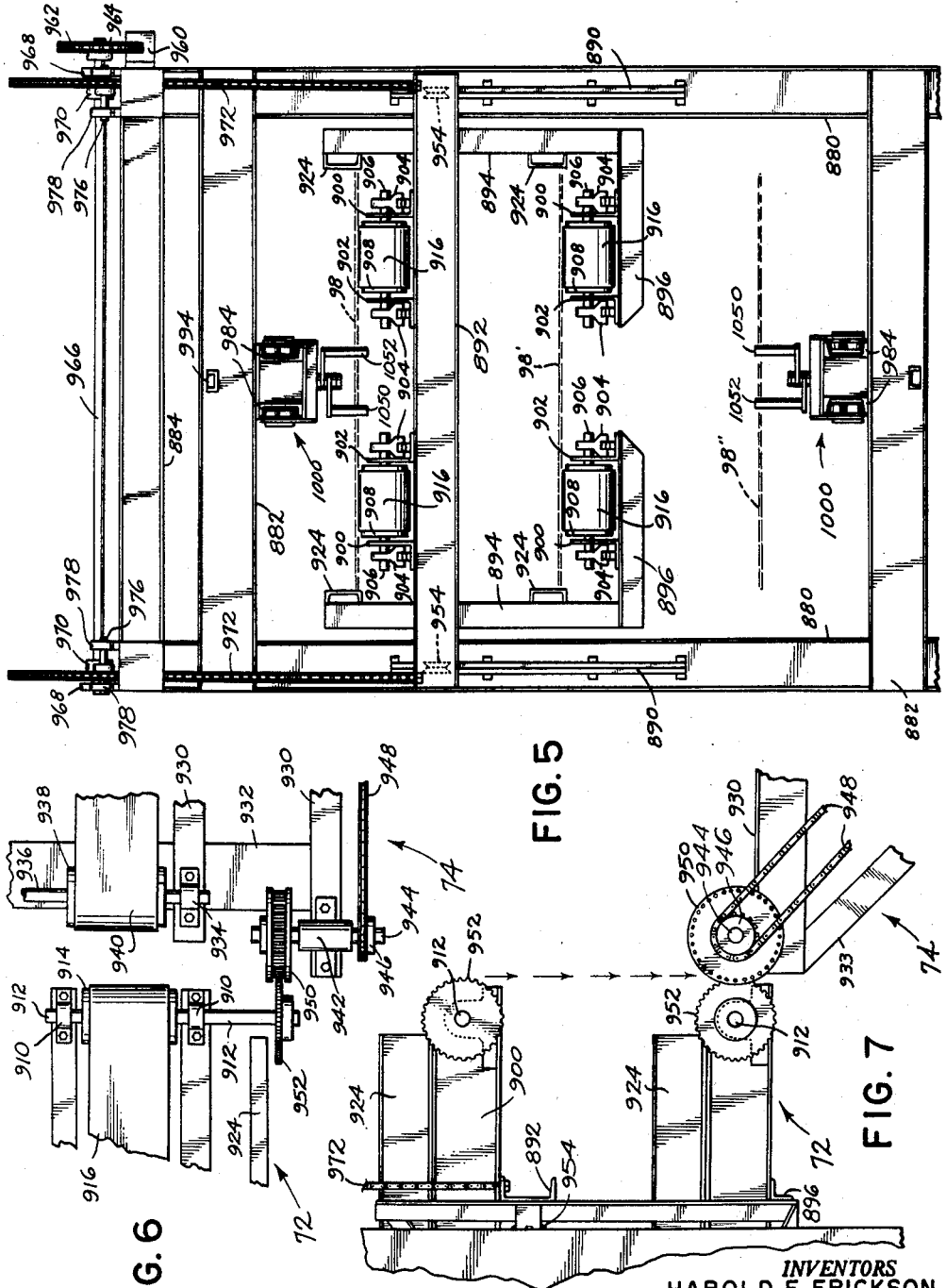
INVENTORS
HAROLD E. ERICKSON
NORMAN E. NELSON
BY CHARLES V. NELSON
DALE L. SCHUBERT
*Eugene P. Farley*
ATTY.

United States Patent Office 2,930,474
Patented Mar. 29, 1960

2,930,474

MAT HANDLING METHOD AND APPARATUS

Harold E. Erickson, Auburn, and Norman E. Nelson, Charles V. Nelson, and Dale L. Schubert, Tacoma, Wash.; said Erickson assignor to said Schubert and said Norman E. Nelson and Charles V. Nelson assignors, by mesne assignments, to Industrial Development Co., Tacoma, Wash., a corporation of Washington Original application March 21, 1957, Serial No. 647,589. Divided and this application September 2, 1958, Serial No. 758,352

5 Claims. (Cl. 198—31)

This invention relates to mat handling method and appartus. It pertains particularly to method and apparatus for handling compactible mats composed of small pieces or lignocellulose.

In the manufacture of hardboard and other composition board products, lignocellulose particles are first mixed with adhesive and formed into mats by suitable felting apparatus. For convenience in handling as well as for application in a subsequent hot pressing operation, the mats are formed directly upon, or are transferred to, metal caul plates of suitable dimensions. The caul plates and superimposed mats then are conveyed to a press loader which loads them into a multi-opening hot press. There the mats are pressed to the desired density.

A difficulty inherent in the formation of fibrous mats and their conversion into consolidated products resides in the fact that prepressing operations such as are outlined above are time consuming and as a consequence it is not possible to employ a felter of high capacity to full advantage in a progressively moving plant production line.

Accordingly it is the general purpose of the present invention to provide method and apparatus for handling mats of varying dimensions, the application of which results in the production of prepressed mats having square, uniform edges at a rate sufficiently high to keep pace with a high capacity felter. The mats thus produced then are suitable for loading rapidly into a press loader and thence into a hot press for consolidation into boards having edges of uniform density which require little trimming. In this manner a very substantial loss of material is virtually eliminated.

The manner in which the foregoing and other objects of this invention are accomplished will be apparent from the accompanying specification and claims considered together with the drawings wherein:

Fig. 2 is a view in side elevation of a jump conveyor unit into which the work units are transferred from the felter; this conveyor having for its function the division of the rapidly moving line of work units into two parallel lines which may be stopped for a time sufficient to prepress the units;

Fig. 3 is a view in end elevation of the jump conveyor illustrated in Fig. 2;

Fig. 4 is a view in side elevation of an outfeed jump conveyor in which the work units are transferred from the prepress, this conveyor having for its function transferring the work from the upper and lower outfeed levels of the prepress to the single infeed level of a press loader or other unit;

Fig. 5 is a view in end elevation of the outfeed jump conveyor of Fig. 4;

Fig. 6 is a detail fragmentary, plan view of the outfeed end of the outfeed jump conveyor of Figs. 4 and 5 and of the infeed end of the press loader, or next following operating unit;

Fig. 7 is a fragmentary, detail view in elevation of the outfeed end of the outfeed jump conveyor and the infeed end of the press loader;

Fig. 8 is a sectional view of a work impeller unit mounted on the outfeed jump conveyor of Figs. 4–7 for impelling the work thereon, taken along line 8—8 of Fig. 9; and Fig. 9 is a detail plan view of the work impelling apparatus of Fig. 8, viewed from the underside in the direction of the arrows 9—9 of Fig. 4.

Figure 1:
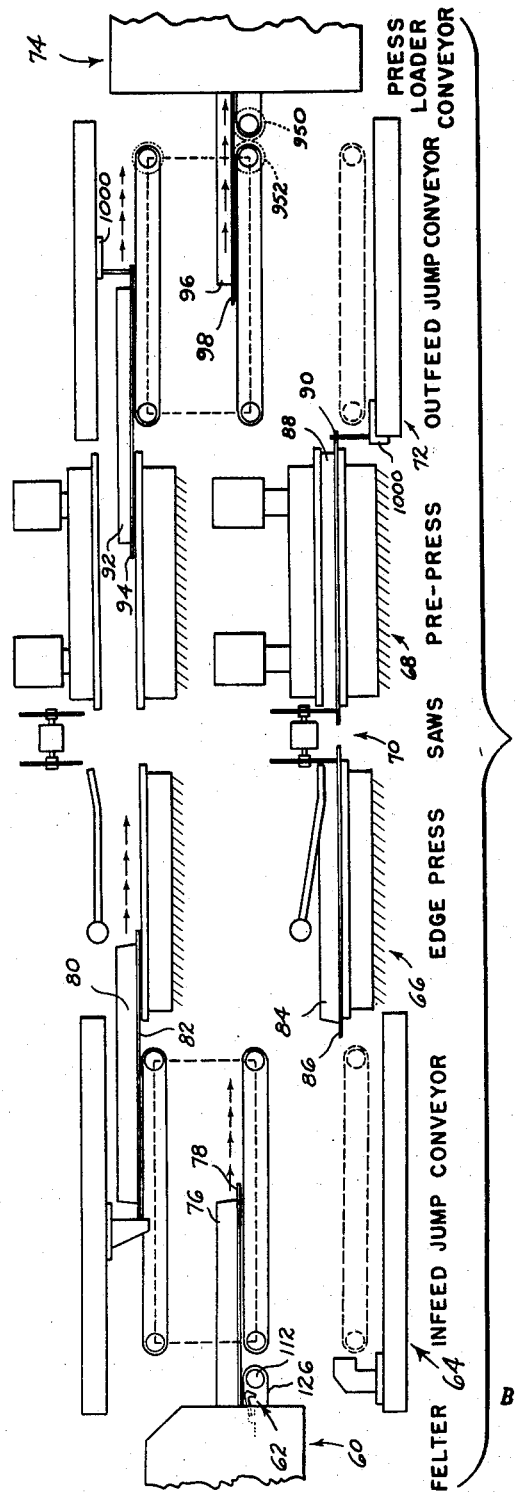
Fig. 1 is a schematic view illustrating the various apparatus units employed in carrying out the herein described mat handling method.

Generally stated, the presently described mat handling method comprises arranging in a line a plurality of longitudinally spaced apart, compactable mats, moving the mats linearly to a succession of stations, compacting the leading portion of a leading mat at a first station, compacting the remainder of the leading mat at a second station, and compacting the leading portion of the next succeeding mat at the first station. The trailing end of the leading mat and the leading end of the next succeeding mat are trimmed off while maintaining both mats under compacting pressure. The pressure then is released and the leading mat advanced to a subsequent station for further processing, while the next succeeding mat is advanced to the second station for further compacting. This sequence is repeated as the remaining mats are moved into the described first and second stations.

The foregoing method results in the formation of prepressed mats having trimmed leading and trailing edges. The side edges may be maintained square and uniform by retaining them between deckle plates or otherwise during the compacting operation. Also, the mat line may be divided into two lines each traveling at an over-all reduced rate to make possible the compacting of the mat output of a high capacity felter.

Considering the foregoing in greater detail and with particular reference to the drawings:

The various operational units employed in carrying out the herein described invention are illustrated schematically in Fig. 1. A felter indicated generally at 60 deposits pieces of lignocellulose or other material on metal caul plates until they are built up into mats of suitable thickness. These mats are conveyed successively out of the felter on a suitable conveyor at a relatively rapid rate. As they reach the outfeed end of the conveyor they are impelled forwardly by impelling apparatus 62 until they are located precisely on an infeed jump conveyor 64.

The jump conveyor has the function indicated above of dividing the rapidly moving mat production line into two lines which move at relatively reduced over-all rates. The mats in these two lines then are transferred to a double edge press 66 having for its function the prepressing of the leading edges of the mats so that they may be guided into a double prepress unit 68. The latter unit prepresses or compacts the remaining area of each mat to the desired thickness.

While adjacent mats are being prepressed in units 66, 68 they are acted upon by traveling saws 70 which trim and square off the trailing edge of the leading mat and the leading edge of the following mat. During these operations the side edges of the mats may be retained between side deckles, not illustrated in Fig. 1 but to be described in connection with subsequent figures.

After the mats have been prepressed and trimmed, they are transferred to a second jump conveyor 72 which receives mats alternately from the upper and lower units of prepress 68 and loads them into a press loader conveyor 74. This carries them to an injector which, in turn, delivers them to the loader of a hot press of suitable design where they are consolidated to the desired density and thickness.

Thus in the schematic illustration of Fig. 1 there are depicted a number of work units in various stages of processing. The work unit comprising mat 76 on caul plate 78 is just leaving felter 60 and entering the lower unit of jump conveyor 64. Mat 80 on caul plate 82 is being transferred from the upper unit of conveyor 60 to the upper unit of edge press 66.

Mat 84 on caul plate 86 is depicted in the process of having its leading edge prepressed in the lower unit of edge press 66. Mat 88 on caul plate 90 is illustrated in position in prepress 68. The trailing edge of mat 88 and the leading edge of mat 84 are being trimmed off by the lower unit of cut-off saws 70. While this is occurring mat 92 on caul plate 94 is being transferred from the upper unit of prepress 68 to the upper unit of jump conveyor 72. Finally, mat 96 on caul plate 98 is being transferred from the lower unit of jump conveyor 72 into press loader conveyor 74.

The individual units of the above assembly are described below.

The work impelling unit

The work impelling unit (caul kicker) 62 employed for removing the work from felter 60 and locating it precisely on jump conveyor 64 is illustrated in Figs. 2 and 3. It is stationed at the outfeed end of the felter conveying system which is supported on a frame which includes transverse frame member 104 and end plate 106. The conveyor frame mounts a pair of spaced parallel angle irons 108, 110. These are traversed by work units including caul plates 78, 78' arranged end to end in spaced apart, linear relationship and each supporting a superimposed mat as has been described above.

The caul plates are driven at a uniform, relatively rapid rate from drive shaft 112 rotatably mounted in bearings 114, 116. Sprockets 118, 120 are keyed to the drive shaft. The sprockets carry chains 124, 126 which engage the caul plates. Guides 128, 130 on each side of the conveying system direct the cault plates in a precisely linear path.

Drive chains 124, 126 carry the work units to the outfeed end of the conveying system, transferring them into one or the other of the divisions of jump conveyor 64. However, because of the space necessarily present between the felter and the jump conveyor, the work units can not be located on the latter with the precision necessary for timing the subsequent operations. Impeller unit 62 is employed for controlling this operation with the requisite precision.

The impeller unit is driven by a crank 132 rigid to the end of conveyor drive shaft 112. Pin 134 on crank 132 is journaled in one end of a connecting rod 136. A second pin 138 on a crank arm 140 is journaled in the other end of the connecting rod. Crank 140 is keyed to a rocking shaft 142 journaled in bearings 144 mounted on the frame of the unit.

Shaft 142 drives the impelling mechanism which is employed in pairs, one unit on each side of the apparatus. To this end, segmental pinion gears 146 are keyed one to each end of the shaft. These gears engage racks 148 which move in guideways formed by the spaced, parallel strips 150, 152.

Slides 154 connected to one end of the racks slide on strips 150, 152 and support their respective outer ends. The balance of the load is carried by pinion gears 146 working against cross pieces 156 which interconnect the guide strips directly opposite and above the pinion gears. In this manner the racks may be supported and reciprocated back and forth within the guideways.

An impelling arm assembly is mounted on each rack. This assembly includes a standard 158 having a forwardly projecting end portion. The body of the standard is transversely perforated and mounts a pin 160 having slotted ends.

The lower end of an outwardly and upwardly extending arm 162 is journaled on pin 160. The upper end of the arm carries an extension 166 extending downwardly and provided with a substantially vertical face surface which is adapted to engage the trailing edges of the work units.

Resilient means are connected to the arm for urging it normally toward the path of travel of the work units and into engagement therewith. Accordingly coil springs 168 are mounted on the respective ends of pin 160, one end of each spring being retained in the adjacent slotted end of the pin and the other end being fastened to a pin 170 extending outwardly from the side of the arm.

Means also are present for limiting the extent of advancement of the arm into the path of travel of the work units. In the illustrated embodiment the limiting means comprises a cross bar 172 welded across the bottom of the arm and positioned for engagement by the forwardly extending end portion of standard 158.

To facilitate passage of the work units across the arm the latter is provided with rollers 174. These are mounted on a shaft 176 rotatably mounted on the outer end of the arm.

In operation, the impelling apparatus reciprocates beneath the work units at a rate determined by the speed of rotation of conveyor belt drive shaft 112. During traversal of the arm assembly by the work units, the arm is depressed against the resilient force of spring 168. Rollers 174 track on the under surfaces of the work units. However, as soon as a given work unit has passed over the assembly, spring 168 drives the arm upwardly to a position determined by that at which the projection on standard 158 engages cross bar 172.

Continued reciprocation of the impelling apparatus brings the vertical pushing surface of extension 166 into contact with the trailing edge of the work unit which accordingly is advanced until rack 148 reaches the forward limits of its travel. The work unit thus is located on the infeed jump conveyor precisely in position for the next operation, while the impelling apparatus is retracted by continued operation of the reciprocating drive.

The infeed jump conveyor

As has been indicated above, the function of the infeed jump conveyor is to receive work units from a production line traveling at a relatively high rate of speed and to divide them into two lines to permit the performance of a selected, time-consuming operation upon them. For example, in the illustrated embodiment the jump conveyor receives work units comprising fibrous mats, each carried by a caul plate on which it has been deposited by a high capacity felter, and discharges them alternately into two outgoing lines in which they are subjected to a relatively time consuming mat prepressing operation.

Broadly considered, the jump conveyor described herein for accomplishing the foregoing purpose comprises a pair of vertically spaced apart, work unit receiving racks, means for mounting the racks for vertical reciprocation between a first station wherein the lower rack is in position for receiving a work unit from an incoming line and the upper rack is in position for discharging a work unit into an upper outgoing line, and a second station wherein the upper rack is in position for receiving the work unit from the incoming line and the lower rack is in position for discharging a work unit into a lower outgoing line. Drive means are connected to the racks for reciprocating them substantially synchronously between the two stations, and discharging means are positioned at each station for discharging the work units from the racks into the respective outgoing lines.

Considering the foregoing in greater detail and with particular reference to Figs. 2 and 3 of the drawings which illustrate the herein described infeed jump conveyor.

As is apparent from the drawings, the conveyor is mounted in a rectangular frame which includes the vertical standards 180, cross pieces 182, top pieces 194 and diagonal braces 186. Vertically disposed tracks 190 are mounted on standards 180. Where, as illustrated, the standards are I-beams, the tracks may comprise elongated members affixed to the webs of the I-beams are having V-shaped tracking surfaces.

A pair of vertically spaced apart horizontal racks are mounted within the frame for receiving the work units from the incoming line. The racks include cross pieces 192 welded to uprights 194 which carry at their lower extremities the inwardly directed support pieces 196. The intermediate uprights are braced by diagonals 198.

Spaced, longitudinally-disposed plates 200, 202 are supported on the upper level by cross pieces 192 and on the lower level by support pieces 196. A plurality of spaced, horizontally disposed rollers 204 are journaled in these two plates for supporting the work units.

Where the work units include mats of unconsolidated lignocellulose particles, the side edges of the mats may be retained by deckle assemblies, the construction of which is illustrated in Fig. 3. These assemblies include deckle plates 206, supported on uprights 194 by deckle support arms 208. These arms are provided with horizontal slots, and the uprights 194 with vertical slots so that both horizontal and vertical adjustment of the deckle plates may be secured by adjusting bolts 210.

Means are provided for securing the vertical reciprocation of the racks which support the work units. To this end, the rack assembly is provided with vertically disposed, grooved wheels 212 which ride on vertical tracks 190. The assembly is driven by means of a fluid operated cylinder 220 which is mounted horizontally on top piece 184 of the frame. To one end of the piston rod of cylinder 220 is connected a flexible link member, e.g. chain 222, which is mounted about the periphery of a wheel, e.g. sprockets 224.

Sprocket 224 is keyed to a shaft 226 journaled in bearings 228 mounted on top pieces 184. The stroke of the piston rod of cylinder 220 is such that chain 222 rotates sprocket 224, and hence shaft 226, through a restricted arc, for example, one of about 180°.

Keyed to shaft 226 are a pair of sprockets 230 which preferably are of substantial size relative to sprocket 224. Chains 232 are mounted on these sprockets with their respective ends attached thereto at points which are substantially at 180° from each other.

Chains 232 engage idler sprockets 234 keyed to shafts 236 which are journaled in bearings 238. The lower ends of the chains are attached to the outermost cross pieces 192 of the rack assembly.

Chains 232 thus support the weight of the racks, which may be reciprocated between raised and lowered stations upon reciprocation of the piston rod of cylinder 220, the extent of raising and lowering of the racks being determined by such factors as the stroke of the piston rod and the relative diameters of sprockets 224, 230.

The work units are discharged from the infeed jump conveyor by suitable discharge means. In the illustrated embodiment the discharge means comprises pusher assemblies, one for each rack, mounted on trolley supports and reciprocated in horizontal planes for pushing the work units out of the racks in the outfeed direction.

The discharge assembly for the upper racks mounted on a pair of tracks 244 which may comprise outwardly directed channel irons welded to cross pieces 182. It is driven from a reversible hydraulic motor 246, the shaft of which drives worm gears 248 which in turn rotate shaft 250. Keyed to shaft 250 is a sprocket 252 which engages and drives a chain 254 extending the length of the apparatus between tracks 244. Chain 254 engages an idler sprocket 256 keyed to shaft 258 which is journaled in bearings 260.

The respective ends of chain 254 are fastened to and drive the work unit pushing assembly. This assembly includes a trolley comprising side plates 262, a face plate 264, and a horizontal stiffening plate 266. One end of chain 254 is connected to the central section of face plate 264 while the other end of the chain is attached centrally to horizontal plate 266.

Wheels 270 are rotatably mounted on shafts carried by side plates 262. The wheels are arranged in upper and lower pairs which engage, respectively, the upper and lower flanges of channel irons 244. Accordingly by operation of reversible hydraulic motor 246, the discharging assembly may be reciprocated between a retracted position in which it is completely behind the work units as they rest on the racks and an advanced position in which it is at a forward limit at which the work units are discharged from the racks onto the next processing unit.

The lower work unit discharge assembly is of similar construction. It is mounted on a pair of tracks 274 which may comprise spaced apart, parallel, outwardly directed channel irons. The assembly is driven by a reversible hydraulic motor 276, the shaft of which drives worm gears 278. These gears are connected to a rotatable shaft 280 which carries a sprocket 282. A chain 284 engages sprocket 282, the lower stretch of the chain being supported by a chain guide 285. Chain 284 also engages an idler sprocket 286 keyed to a shaft 288 which in turn is journaled in bearings 290.

The respective ends of chain 284 are fastened to the work pushing unit which comprises a pair of spaced, parallel, side plates 292, a face plate 294, a top plate 296, and a horizontal bottom plate 298. Wheels 300 tracking on the upper and lower flanges of channel irons 274 are rotatably mounted on side plates 292. Thus the discharge assembly may be reciprocated by operation of the reversible hydraulic motor 276 between a retracted position wherein it lies entirely behind the work unit and an advanced position wherein it discharges the work unit from the outfeed side of the apparatus.

Assuming that the infeed jump conveyor described above is initially in the position of Figs. 1, 2 and 3, its operation is as follows:

A work unit conveyed out of felter 60 is located precisely on rollers 204 of the lower rack by means of impeller assembly 62. Cylinder 220 then is released. The rack carrying the work unit thereupon drops to a position wherein it is aligned with face plate 294 of the lower discharge assembly. At the same time, the upper rack including the upper set of rolls 204 is brought into alignment with conveyor 126 of felter 60. This sequence occurs during the time interval elapsing between the discharge of the first and second continuously moving, but spaced-apart, work units from felter 60.

The lower discharging unit then pushes the work unit out of the infeed jump conveyor into the next operational unit. Simultaneously, the next succeeding work unit is delivered onto the rolls of the upper rack and located there by the action of impeller 262. Thereupon the piston rod of cylinder 220 is retracted. This rotates sprockets 224, 230 in a counter-clockwise direction, elevating the racks to the position of Fig. 3, i.e. the full line position of Fig. 1.

Hydraulic motor 276 is operated in the reverse direction to return the lower pushing assembly to its starting position, and hydraulic motor 246 is operated to advance the upper pushing assembly against the work unit which now lies on the upper bank of rolls 204. This work unit is removed from the conveyor, the next succeeding mat being contemporaneously introduced onto the lower bank of rollers and located there by impeller 262. Reversible motor 246 then is operated to return the upper discharge unit to its starting position. This completes the cycle, which is repeated as required to accommodate the continuous flow of work units out of felter 60.

The effect of the operation thus is to divide the rapidly and continuously moving production line into two lines to provide a time interval sufficient to permit the functioning of the next operating unit. Where the work comprises fibrous mats to be prepressed preliminary to introduction into a hot press, this operating unit comprises the edge press indicated generally at 66 in Fig. 1.

The edge press unit

The edge press selectively compacts the leading end portions of the mats. It includes a press platen, conveying means positioned for stationing the leading end of each mat in turn within the operating range of the platen, and drive means connected to the platen for alternately advancing and retracting it with respect to the mat. This compacts the leading end thereof to the predetermined thickness. The conveying means thereupon removes the mat to the next operating station. Deckles are provided for confining the side edges of the mat during this sequence.

The edge press unit indicated generally at 66 in Fig. 1, is illustrated in detail in Figs. 6–16 inclusive of the drawings. It is positioned immediately downstream from infeed jump conveyor 64 for receiving the work units from the discharge end thereof. Its frame includes the uprights 310, the horizontal members 312, and the transverse members 314.

It also includes upper and lower banks of longitudinally divided, horizontal rollers 316 upon which the work units are pushed from the infeed jump conveyor and on which they are advanced to communicating, longitudinally divided bed plates 317. Spaced, parallel deckle plates are located one on each side of the respective sets of rollers for retaining the side edges of the work units, which in the illustrated form of the invention comprise compressible mats of fibrous particles.

A platen 320 is supported and reinforced by a frame including spaced, parallel, side plates 322, top plate 324 and face plate 326. This frame is pivotally mounted on arms 328, the outer ends of which are pivoted in a selected one of two or more positions of vertical adjustment by pins 330 inserted in openings through the arms and through standards 332 extending upwardly from longitudinal frame members 312.

Platen 320 comprises an angular metal plate having a removable end strip 321 and removable side strips 323 to accommodate mats of varying dimensions. Platen 320 is formed with a leading section adapted to lie horizontally when the platen is in pressing position and a trailing section which slopes gradually upwardly. Accordingly, when the platen is applied, it presses the leading end of the mat substantially flat, the portion of the mat immediately behind tapering upwardly toward the rear. This avoids fracturing the mat and makes possible introducing it easily into subsequent operating units.

The platen assembly is reciprocated between raised and lowered positions by means of fluid operated cylinders 334. The lower ends of these cylinders are pivotally attached to the frame by means of pins 336. The piston rods of the cylinders are provided with clevises 338 which are connected through pins 340 to extensions of the platen frame.

Hence as the piston rods of cylinders 334 are reciprocated, the platen is moved between the retracted position illustrated in the upper unit of Figs. 6 and 7, and the working position illustrated in the lower unit thereof. It is to be noted that when the platen is in the latter position it compresses the mat firmly against the caul plate, which projects slightly beyond the apparatus. Hence the irregular leading edge of the mat may be trimmed off as will be described hereinafter.

To prevent bending the caul plates in the opening between the two halves of longitudinally divided bed plate 317 when pressure is applied by the platen, there is provided a sliding plate 342 (Fig. 8) which moves in a guideway 344. To the underside of the plate is welded a tab 346 which extends through a transverse slot in bed plate 317. The piston rod of a cylinder 348 is connected to the tab.

Accordingly, when a pressing operation is to be performed, plate 342 may be moved across the opening between the divisions of the bed plate, forming a continuous surface on which the caul plate carrying the compressible mat is supported, as in the lower prepress unit of Fig. 7. However, when it becomes necessary to move the caul plate off the unit, the plate may be moved out of the way, as in the upper prepress unit of that figure.

The work units supported on the longitudinally divided sets of rollers 316 and bed plate 317 are driven through the apparatus by a drive illustrated particularly in Figs. 9, 10, and 11. The drive unit is mounted on a pair of spaced, parallel tracks 350 extending longitudinally of the apparatus beneath the opening between the rollers and bed plate divisions.

A car or trolley is mounted for travel back and forth on the tracks. It comprises a base plate 352, a pair of spaced side plates 354, and cross pieces 355, 356, 357. Wheels 358 are rotatably mounted on the trolley and roll on tracks 350.

A resiliently mounted arm 360 is carried by the car for engagement with the work units. It comprises a pair of spaced, parallel bars pivotally mounted on a shaft 362 carried between side plates 354. The arm is formed with an extension 363 to which one end of coil spring 364 is connected. The other end of the spring is attached to a frame member of the car.

Hence the spring maintains the arm normally in an elevated position in which its forward end lies in the path of travel of the work units and therefore can engage the same when the car is driven forwardly. However, when the car is driven towards the rear, the arm is depressed against the resilient force of spring 364 by contact with the under surface of the work units. The upper surface of the arm then slides along the under surface of the work unit on rollers 366 provided for that purpose.

The trolley carrying arm 360 is driven from a suitable power source such as the reversible hydraulic motor 370. This motor is fed with fluid under pressure through lines 372, 374. It is controlled by a two-way deceleration valve 376 and reversing switches 378, 379. The latter switches are mounted on tracks 350 at the extreme limits of travel of the trolley and are operated by spring pressed contact arms 380, 381.

Motor 370 is coupled through gear box 382 to drive shaft 384. This shaft is rotatably mounted across the infeed end of tracks 350 in bearings 386. A sprocket 388 is keyed to the shaft. A discontinuous chain 390 engages the sprocket and extends the length of the drive unit. The other end of this chain is supported by a sprocket 392 keyed to idler shaft 394 journaled in bearings 396. The ends of chain 390 are bolted to trolley cross plates 355, 356.

As has been indicated above, the reciprocative movement of the trolley is controlled by the combined action of deceleration valve 376, which reduces the flow of oil through motor 370 and limit switches 378, 379 which reverse the motor. The stem of deceleration valve 376 is actuated by a cam 400 which is fast to a rock shaft 402. A crank arm 404 is keyed at about its midpoint to the same shaft. The ends of crank arm 404 are connected through links 406 to cranks 408. The latter in turn are rigid to rock shafts 410 to which fingers 412 are fixed.

Fingers 412 are maintained in a normally raised position wherein they lie in the terminal path of travel of the trolley by means of a spring 414 which interconnects a frame member and an extension of one of cranks 408. The extent of such elevation of the fingers is limited by stop 416. Hence as the trolley moves back and forth on tracks 350 it alternately contacts the forward and rearward fingers 412, depresing them and operating the lever system to advance cam 400 against the stem of valve 376, thereby operating the valve and decelerating the trolley.

At the beginning of the cycle of operation of the edge press unit, the trolley bearing arm 360 is stationed at the extreme infeed end of the unit with the arm in its elevated position. The conveyor drive of the previously described infeed jump conveyor is operated to push the work units onto rollers 316 and bed plate 317. As the work units traverse the arm, they depress it against the tension of spring 364. Then when the work units have passed completely over the arm, it springs upwardly into operating position.

After the work unit has been pressed by the action of platen 320, motor 370 drives chain 390 in a forward direction, moving the trolley bearing upraised arm 360 forwardly and pushing the work unit off the edge press onto the next operating unit. As the trolley reaches the end of its forward travel, it contacts successively forward finger 412 and switch 378, whereupon its movement is decelerated and then reversed, whereupon it returns to its starting position ready for the introduction of another work unit into the edge press.

As has been indicated above, the presently described edge press is provided with deckle plates having for their function confining the side edges of the work units introduced into the edge press so that they will be defined uniformly and sharply. Stationary deckle sections 418 are provided at the infeed end of the edge press. Deckle sections 420 which move both upwardly and outwardly are provided at the outfeed end of the press to separate them from the work units after the operation of platen 320, thereby permitting their progression through the edge press. The construction of the deckle assembly on one side of the press is illustrated in Figs. 12-16 inclusive.

Stationary deckle section 418 is provided with slotted flange 422 secured to slotted upright frame member 424 by bolts 426. The stationary deckle section also carries a vertical flange 428 which is bolted to the slotted upright frame member 430. Vertical frame member 430 is secured to adjacent frame members of the unit by means of bolts 432.

The infeed end of movable deckle 420 is supported by the outfeed end of stationary deckle 418 and the outfeed end of the movable deckle is supported adjustably on post 310 in a manner to be described below. Hence the entire deckle assembly is mounted on the frame of the unit adjustably in a vertical direction as required to position the deckle plate properly for confining the side edge of the work unit.

The infeed end of movable deckle section 420 is hinged to the outfeed end of stationary deckle sections 418 to permit the outfeed end of the former deckle section to be swung outwardly, in gate-like fashion, by an amount sufficient to separate the deckle section from the work units after operation of platen 320.

To this end the deckle section is provided with the longitudinally extending, horizontal flange 434, foot plate 436, and wear plate 438. Pad 440 is mounted on the infeed end of flange 434. Pad 442 is mounted on the corresponding end of foot plate 436. Post 444, which acts as a hinge pin, is welded to pads 440, 442 and also to flange 434. Encircling post 444 is a stationary sleeve 446 which is rigidly connected to frame member 430 by plate 448. In this manner the inner end of movable deckle section 420 is hingedly connected to the fixed deckle section.

The outfeed end of movable deckle section 420 is supported by a fixed collar 450 clamped to post 310. A pair of spaced rotatable collars 452 are also mounted on the post, the lower collar of this pair bearing against fixed collar 450.

Collars 452 are formed with horizontal extensions which are interconnected by a web member 453 and which mounts a fixed pin 454. A sleeve 456 is rotatably mounted on this pin. It supports a bracket 458.

Horizontal plates 459, 460 are welded to the opposite sides of the inner end of the bracket and a sleeve 462 is fixed between these plates and the bracket. A post 464 which serves as a hinge pin is journaled in the sleeve. The lower end of the post is fixed in a socket 466 which is welded to foot flange 436. The upper end of the post penetrates an opening in flange 434 and a registering opening in pad 468 welded thereto, thus forming a hinge upon which the outer end of deckle section 420 turns.

Angular movement of the deckle section is obtained by the action of a short stroke, fluid operated cylinder 470. The rear end of this cylinder is connected pivotally to a tab 472 welded to collar 450 which is clamped to post 310. Its piston rod is connected through a pin and clevis 476 to an extension of plate 460.

Thus as the piston rod of cylinder 470 moves in and out, the outer ends of deckle plate sections 420 swing inwardly and outwardly. During this movement, collars 452 rotate about post 310, sleeve 456 about pin 454 and sleeve 462 about post 464.

Deckle section 420 is reciprocated in a vertical plane by means of cylinder 480. The base of this cylinder is pivotally connected to a tab 482 extending outwardly from the face of the deckle. Its piston rod is threaded into a clevis 488 and lock nut 490 for adjustment of the relative positions of the clevis and cylinder.

Clevis 488 is pivotally connected to a radially extending crank projection of radial flange 494 which is rigid to a hollow shaft 496. This shaft is rotatably mounted about a horizontal rod 498 from which it is spaced by suitable spacing elements. The respective ends of rod 498 are supported by brackets 500 having at right angles to the body thereof perforated projections which encircle posts 444, 462 respectively.

The infeed end of hollow shaft 496 carries a rigidly fixed radial flange 502 which corresponds to flange 494 on the outfeed end of the shaft. Both of flanges 494, 502 have inwardly extending yokes 504. The yokes in turn engage pins 506 extending transversely between spaced vertical plates 508 running between horizontal flange 434 and foot 438 on the outer face of deckle section 420. Accordingly, as piston rod 486 of cylinder 480 is extended and retracted by predetermined strokes, hollow shaft 496 is rocked back and forth about rod 498. This moves yokes 504 angularly which in turn imparts a vertically reciprocating movement to deckle plate section 420.

The operation of the edge press unit whereby the leading edges of the work units are prepressed to a predetermined thickness is as follows:

The work units comprising, for example, ligno-cellulose mats carried on metal caul plates, are introduced alternately to the upper and lower units of the edge press 66 by the impelling elements of the infeed jump conveyor 64. Plate 342 covers the opening between divided bed plate sections 317, and the outfeed deckle sections 420 are shifted inwardly and downwardly to restrain the side edges of the mat.

Cylinders 334 then are retracted, lowering angled press platen 320 into engagement with the leading edge of the mat and pressing it to the contour apparent in Fig. 6. While the leading edge of the mat is thus compressed, it may be squared off by the operation of trimming saws as will be considered hereinbelow.

After the pressing operation has been completed, cylinders 334 are extended to elevate the press platen. Cylinders 470 are retracted to swing the outfeed deckle sections 420 about posts 444 and thus separate them laterally from the consolidated mat. Cylinders 480 are extended, working the crank projections on flanges 494 carried by horizontal hollow shafts 496. This rotates the shafts, elevating the yokes 504 and hence the deckle sections until the foot plates thereon clear the work units against which they bear during the pressing cycle.

Cylinder 348 is retracted, withdrawing plate 342 from across the opening between the two sections of bed plate 317. The trolley bearing pushing arms 360 then is advanced by the operation of hydraulic motor 370. Thereupon the arms push the work into the next unit of the herein described apparatus, i.e. the prepress, after which the trolley is withdrawn preliminary to introduction of another work unit into the edge press.

*The prepress unit*

As indicated above, the prepress has for its general function pressing (to the predetermined density and thickness) the areas of the mats not acted on by the edge press. Its construction is illustrated in Figs. 17–24 inclusive.

Like the edge press, the prepress is divided into upper and lower pressing units. It is supported on a foundation frame including posts 520 and cross pieces 522. The lower platen 524 of the lower pressing unit is carried across this frame.

Upright strain rods 526 extend upwardly from the platen. They carry spaced horizontal frameworks 528, 530.

Lower horizontal framework 530 supports a pair of single acting cylinders 532 which are connected to a source of fluid under pressure through conduits 534. The piston rods or rams 536 of these cylinders are connected to a supporting frame 538 which carries the upper platen 540 of the lower press unit. This platen is fitted with removable strips 541 which may be used when large mats are being pressed.

A double acting cylinder 542 cooperates with single acting cylinders 532. It is connected to a source of fluid under pressure by means of conduits 544, 545. Its piston rod 546 is connected to frame 538 carrying platen 540.

Single acting cylinder 532 assisted by double acting cylinder 542 jointly advance the platen toward the work. However, the platen is retracted by sole operation of cylinder 542 which lifts the platen together with rams 536 of the single acting cylinders. This permits application of relatively inexpensive single acting cylinders while still retaining effective operation of the unit.

Deckle plates 550 are included in the pressing assembly for retaining the side edges of the work during the pressing operation. These units are connected to sleeves 552 which are slidably mounted on post 526 in a manner to be explained hereinafter.

Frame 530 carries the lower platen 554 of the upper pressing unit of the prepress. This unit includes single acting cylinders 556 mounted in frame 528. These cylinders correspond in construction and function to cylinders 532 of the lower unit. They are supplied with fluid through lines 558. Their rams 560 are connected to a supporting frame 562 which carries the upper platen 564 of the upper unit. This platen carries removable edge strips 565 which, like strips 541 on platen 540, are used when pressing mats of large area.

A double acting cylinder 566 is also mounted in frame 530. It is supplied with fluid under pressure through lines 568, 569. Its piston rod 570 is attached to frame 562.

This cylinder is analogous to double acting cylinder 542 of the lower unit in that it cooperates with the single acting cylinders 556 in advancing platen 564 into contact with the work. Furthermore, it retracts the platen and associated framework as well as rams 560 of the single acting cylinders after the pressing operation has been completed.

Spaced, parallel deckles 572 are mounted on each side of the apparatus for retaining the side edges of the work during operation of the prepress. These deckles are connected to sleeves 574 which, like sleeves 552, slide on posts 526. Their construction and manner of functioning are illustrated in Figs. 18–24 inclusive.

Each of the deckles, for example, one of deckles 550 mounted on platen 524, is supported on spaced posts 580 which are threaded into the platen (Fig. 23). A pair of lever arms 582 is connected to each post by means of pin 583.

A crank arm 584 is pivotally connected to levers 582 by means of pin 586. The crank arm in turn is rigid to the end of a horizontal, hollow shaft 588. A lever 590 is pivotally connected to the intermediate section of crank 584 by means of pin 592. This lever is rigid to one end of a bar or box girder 594. The end segments of the box girder are formed with transverse openings which communicate with sleeves 596 extending inwardly from one face of the box girder. (Fig. 21.)

Extending outwardly from the opposite face of the box girder are supporting tabs 598 (Fig. 19). These support a rigidly mounted rod 600 which carries a pair of bearings 602 mounting the horizontal, hollow shaft 604.

Spaced pairs of ears 606 are fixed to the upper surface of the shaft 604. Each of these is pivotally connected by pin 608 to link 610 (Fig. 21) in a selected position of lateral adjustment as determined by the presence or absence of area strips 541, 565 on platens 540, 564. The link member in turn is pivotally connected through pin 612 to a piston or plunger 614 slidably mounted in the transverse opening in the box girder 594, and communicating sleeve 596, bushings 616 and 618 being included in the assembly for the usual purpose.

Plunger 614 is connected to and supports deckle 550. Its inner end terminates in a square plate 620 which is bolted to a longitudinally extending plate 622. The latter plate is releasably secured to the deckle by bolts 623 and has a horizontal flange or foot 624 along its lower margin. This supports wear plate 626 which contacts the adjacent margin of the work unit supported on platen 524.

The framework described above supports not only deckle 550 but also the drives by means of which the deckle is reciprocated in both horizontal and vertical planes. Its reciprocation in a horizontal plane is effectuated by operation of a cylinder 630 (Fig. 20), the forward end of which is pivotally mounted on shaft 632 journaled in bearings 634. These bearings in turn are bolted to spaced standards 636 braced with plate 638.

The piston rod of cylinder 630 is pivotally connected through pin 640 to crank 642 which is rigid to hollow shaft 604. Accordingly extension and retraction of the piston rod of cylinder 630 moves plungers 614, and hence deckle plate 550, outwardly and inwardly, respectively, with respect to the work on platen 524.

Vertical reciprocation of the platen is obtained by operation of cylinder 650 (Fig. 22). This cylinder is pivotally mounted on shaft 652 journaled in bearings 654. These bearings are bolted to brackets 656 which are welded to the outer face of box girder 594.

Accordingly extension and retraction of the piston rod of cylinder 650 rotates shaft 588 clockwise and counterclockwise, respectively. This elevates and lowers, respectively, the entire assembly including hollow shaft 588, hollow shaft 604, box girder 594, plungers 614, and deckle plate 550, sleeves 552 sliding up and down on posts 526.

The overall operation of the prepress is as follows:

The work is impelled alternately onto the upper and lower decks of the prepress by the impelling mechanism of edge press 66, deckle plates 550, 572 being elevated and retracted. When the work has been located on the lower platen, e.g. lower platen 524 of the lower deck, deckle 550 are lowered and advanced. The upper press platen 540 then is lowered by the combined action of the single and double acting cylinders 532, 542 connected thereto. While the work is confined by the press, its trailing edge may be trimmed by suitable apparatus to be described hereinbelow. The platen then is raised by the sole action of double acting cylinder 542, the side deckles are retracted, and the work removed from the prepress for further processing.

The trim saw unit

As has been indicated above, while the leading mat is confined in prepress 68 and the trailing mat in edge press 66, the trailing edge of the former and the leading edge of the latter may be squared off and trimmed by suitable apparatus. Such apparatus comprises a traveling saw assembly indicated generally at 70 in Fig. 1 and illustrated in detail in Figs. 25–32 inclusive.

Like the edge press and prepress, the saw assembly includes cooperating upper and lower decks. Each deck includes a track mounted across the work, a trolley mounted for reciprocation on the track, and spaced saws mounted on the trolley. Drive means are provided for reciprocating the trolley on the track as well as for lowering the saws into operative position and raising them into inoperative position. Deckle plates provided with means for both elevating them and retracting them confine the side edges of the work as it traverses the trim saw unit.

The saw and deckle assemblies are mounted on a frame which includes upright posts 670 (Figs. 25, 26). Posts 670 support an upper saw unit 672 illustrated with the saw in retracted, inoperative position, an upper deckle assembly 674 illustrated with the deckles in raised operative position, a lower saw assembly 676 illustrated with the saw in advanced, operative position, and a lower deckle assembly 678 illustrated with the deckles in lowered, inoperative position.

The upper and lower saw assemblies are substantially identical in construction. Each is mounted on a framework including sleeves 680 clamped to posts 670, longitudinal side plates 682, transverse side plates 684, top plate 686, bracket 688, tie plates 690, and angle irons 692. A pair of parallel, horizontal tracks 694 are welded to the inner bottom margins of side plates 684 (Figs. 29, 30). A pair of parallel horizontal chain guideways 696 are welded to angle irons 692.

Tracks 694 mount a trolley which reciprocates back and forth across the unit and carries the trim saws. The trolley includes a centrally cut-away horizontal plate 700 which carries on its upper surface a pair of spaced blocks 702 and on its under surface cross bars 704, 706 as well as chain guides 708.

Shafts 710 are journaled in bearings 712 mounted on the forward and rearward ends of plate 700 respectively. Grooved wheels 714 are fixed to the ends of the shafts and track on the upper surfaces of tracks 694.

Shafts 716 are journaled in bearings 718 bolted through filler blocks 720 to the underside of plate 700 at the respective ends thereof. Flat wheels 722 are secured to the ends of the shaft and track on the under surfaces of tracks 794. Spaced grooved wheels 724 are fixed to shaft 716 inside bearings 718.

The trolley is driven by motor 726 bolted to frame plate 682 (Figs. 27, 28). The shaft of the motor is coupled to a gear box 728 to the shafts of which are keyed sprockets 730.

An idler shaft 732 is journaled in bearings 734 at the side of the unit opposite sprockets 730. This shaft carries sprockets 736 which, together with sprockets 730, engage and support a pair of parallel, discontinuous, drive chains 738. The respective ends of these chains carry threaded extensions 740. These extensions on the forward end of the trolley are slidable in openings through cross bar 704 of the trolley frame. The same members on the rear end of the trolley are slidable in openings through cross bar 706 of the trolley frame. Each of the extensions is threaded into a nut 742, which may be adjusted as required to tighten the chains.

The upper stretches of chains 738 are supported by longitudinal chain guides 696. The lower stretches of the chains are supported by the upper surface of parallel, longitudinal bars 744 the ends of which are connected to the frame of the unit. The under surfaces of these bars are received and supported by grooved wheels 724, thus insuring adequate support for the chains.

The saw unit which depends from the above described trolley is supported in part from a block 750 affixed to the under side of plate 700 and extending downwardly therefrom. A sleeve 752 is rigidly affixed to the lower end of this block. A shaft 754 is journaled in the sleeve.

The inner ends of a pair of spaced side plates 756 are fixed to the respective ends of shaft 754. An end plate 758 spans and is connected to the two side plates, forming a housing for the saw drive.

The outer ends of side plates 756 mount bearings 760 in which is journaled a shaft 762 (Fig. 25). Circular saws 764 are fixed to the outer ends of this shaft, and spaced pulleys 766 are keyed to the intermediate portion thereof inside of bearings 760.

Saws 764 are driven from a motor 770 mounted on the saw frame. The shaft 772 of this motor carries pulleys 774 which are connected through belts 776 to pulleys 766 on the saw shaft.

The saws are lowered and raised between operative and inoperative positions by a cylinder 780, the flat base of which is connected to a short, transverse shaft 782. This shaft is journaled in bearings 784 mounted on blocks 702 which in turn are carried on plate 700 of the saw trolley. The piston rod of cylinder 780 is fixed to a shaft 786 which is pivotally mounted in bearings 788 affixed to the saw frame. Accordingly, extension of cylinder 780 lowers saw 764 to the operative position of the lower unit of Fig. 26 while retraction thereof raises the saws to the inoperative position of the upper unit of that figure.

As has been indicated above, the upper and lower decks of the herein described trim saw are provided with deckle plate assemblies 674, 678. These are substantially identical in function and their construction is illustrated particularly in Figs. 25, 26, 31 and 32.

Thus each deckle unit is mounted on a frame comprising sleeves 800 clamped to posts 670, side plates 802, end plates 804, and cross pieces 806. End plates 804 mount tracks 808 which support the work as it traverses the unit.

The deckle plates are mounted on this frame in such a manner that they may be lifted and retracted until they clear the work completely and lie flat, out of the way of trim saws 764. Accordingly each plate is supported on a rod 810 fixed between side plates 804 (Figs. 31 and 32). Rotatably mounted on this rod is a hollow, horizontal shaft 812. Rigidly mounted on the latter shaft by means of filler blocks 814 are spaced vertical sleeves 816.

Mounted for longitudinal movement in these sleeves are rods 818 to which deckle plate 820 is connected by means of horizontal brackets 822. The lower edge of the deckle plate is formed with a horizontal foot flange 824 which carries a wear plate 826.

The lower ends of rods 818 mount a horizontal bar 828. The outer ends of the bar carry tabs 830 which support shafts 832 on which cam followers 834 are rotatably mounted. The cam followers work in the slots of cam plates 836 bolted to the inner faces of side frame plates 804. The slots in the cam plates are downwardly arcuate, communicating however, with substantially horizontal recesses at their inner ends.

The deckle plate assembly is driven by means of a cylinder 840, the rear end of which is pivotally connected through pin 842 to bearings 844 carried by the frame of the unit. The piston rod of the cylinder is connected to a short shaft 846 journaled between bearings 848 extending outwardly from the side face of transverse bar 828.

Accordingly, extension of cylinder 840 raises, retracts and lowers the deckle in the manner illustrated by the dotted line positions of Fig. 32, until it rests in a substantially horizontal position, out of the way of the trim saws. Retraction of the cylinder initiates a reverse sequence, and returns the deckle to a vertical position ready to receive the work.

It will be apparent that as trim saws 764 trim off the adjacent edges of leading and following mats, there is formed a quantity of waste material which must be conducted away from the apparatus. The waste material formed by operation of the upper saws is fanned by fans 864 rigid to the saws and guided by plows 866 welded to the frame into conduit 868 which is pivotally connected to the plows by pin 870. Conduit 868 in turn is connected to flexible conduit 872 which conveys the waste by vacuum back to the bin from which the felter is fed.

Any overflow from this collecting system is caught in a trough 850 supported between side plates 804. This trough has downwardly sloping sides and communicates with a spout 852.

An auger 854 mounted on shaft 856 supported by bearings 858 works in the bottom of the trough. Shaft 856 is coupled to the shaft of a gear box 860 which in turn is connected to a motor 862. Accordingly operation of the motor drives auger 854 which carries the trimmed away material out from beneath the unit into downspout 852, whence it may be returned to the source feeding felter 60.

A vacuum collector similar to that used in the upper saw unit, and a trough similar to trough 850 thereof may be provided beneath the lower saw unit or, instead of using a trough the entire apparatus may be mounted over a pit, not illustrated, in which runs a conveyor positioned for receiving the trim. This collector and conveyor also may return the trimmed away material to felter 60.

The basic operation of trim saw 70 is as follows: The mat-caul plate work units are run through the unit with the deckles raised and the foot flanges thereof bearing against the caul plates. When one work unit has been stationed in prepress 68 and another in edge press 66, the pressing members of these presses are operated for consolidating the mats. Before or during the operation, deckle plates 820 of the trim saw are retracted.

Trim saws 764 then are lowered and the trolley carrying them passed back and forth across the work, trimming off the adjacent edges of the mats. The trim from the upper saws falls into trough 850 and is conducted back to felter 60 via spout 852. The trim from the lower saws may be caught in a pit beneath the apparatus and carried back to the felter by a conveyor not illustrated.

The trim saws then are retracted, the deckle plates raised, and the work advanced to the next succeeding stations. The work in the prepress then is advanced to the outfeed jump conveyor 72 which loads it into press loader conveyor 74 preliminary to its final consolidation in a hot press.

*The outfeed jump conveyor*

The outfeed jump conveyor 72 is similar in construction to the infeed jump conveyor 64 described above. It receives the work from two different operating levels and transfers it to the press loader conveyor at a single operating level. Its construction is illustrated particularly in Figs. 4 to 9 inclusive.

Broadly considered, the outfeed jump conveyor described herein for accomplishing the foregoing purpose comprises a pair of vertically spaced apart, work-receiving racks; and means for mounting the racks for vertical reciprocation between a first station wherein the lower rack is in position for discharging a work unit onto an outgoing line and the upper rack is in position for receiving a work unit from an upper incoming line, and a second station wherein the upper rack is in position for discharging a work unit onto the outgoing line and the lower rack is in position for receiving a work unit from a lower incoming line. Drive means are connected to the racks for reciprocating them substantially synchronously between the two stations. Work impelling means are provided for impelling the work units onto the racks, and work discharging means are also provided for discharging the units from the racks into the outgoing line.

As is apparent particularly from Figs. 4 and 5 of the drawings, the herein described outfeed jump conveyor is mounted in a rectangular frame which includes vertical standards 880, transverse cross pieces 882, top pieces 884 and diagonal braces 886. Vertically disposed tracks 890 are mounted on standards 880. Where, as illustrated, the standards are I-beams, the tracks may comprise elongated members affixed to the web of the I-beams and having V-shaped tracking surfaces.

A pair of vertically spaced apart, horizontal racks are mounted within the frame for receiving the work units from the incoming lines. The racks are carried on a frame including cross pieces 892 welded to uprights 894 which carry at their lower extremity the inwardly directed support pieces 896. The uprights are braced by diagonals 898.

Spaced, longitudinally disposed angle irons 900, 902 are supported centrally on the upper level by cross pieces 892 and on the lower level by support pieces 896. Bearings 904 are mounted on the infeed ends of these structural members. Idler shafts 906 are journaled in the bearings and idler roller 908 are fixed to the shafts.

Bearings 910 are mounted on the outfeed ends of structural members 900 and drive shafts 912 are journaled in these bearings. Drive rollers 914 are keyed to the drive shafts.

Conveyor belts 916 are reeved about rollers 908, 914. The upper stretches of these belts are supported by idler rollers 918 journaled between members 900. The lower stretches of the belts are supported by rollers 920 journaled in bearings 922 depending from the same structural members.

Conveyor means thus are provided for supporting and conveying the work units, e.g. fibrous mats supported on caul plates 98, 98' and 98'', on conveyor belts 916. As the work progresses through the unit it is guided by longitudinal guide plates 924 secured to uprights 894.

Drive roll 914 is driven from the next succeeding operating unit, e.g. press loader conveyor 74 in a manner illustrated particularly in Figs. 6 and 7. As is illustrated in these figures, the mechanism employed for feeding the former unit is mounted on a frame including longitudinal members 930, cross member 932, and brace 933.

This frame is of fixed elevation and carries a conveyor belt assembly includin bearings 934, shaft 936 journaled in the bearings, pulley 938 keyed to the shaft, and conveyor belt 940 mounted on the pulley. This belt and its partner, not illustrated, substantially register with belts 916 on the jump conveyor and in effect provide extensions thereof leading into the press loader conveyor.

The drive for drive roller 914 on the jump conveyor 72 is mounted on the frame of press loader conveyor 74. It includes a wide bearing 942 fastened to the end of outer longitudinal frame member 930, a shaft 944 journaled in the bearing, a sprocket 946 keyed to one end of the shaft and a drive chain 948 engaging the sprocket. A wide sprocket 950 is keyed to the other end of shaft 944. Its teeth mesh with those of narrow sprockets 952 keyed to the ends of shafts 912 on the jump conveyor unit.

Wide sprocket 950 on the press loader conveyor is driven continuously. Accordingly when it is engaged by one or the other of narrow sprockets 952 on the outfeed conveyor, drive rollers 914 thereof are actuated and work units resting on belts 916 accordingly will be transferred to belt 940 of the press loader conveyor. Such engagement of the sprockets is achieved periodically by vertical reciprocation of the frame mounting the former conveyors to put one or the other of upper and lower sprockets 952 into meshing engagement with sprocket 950.

Accordingly the rack assembly mounting the conveyors is provided with vertically disposed, grooved wheels 954 which ride on vertical tracks 890 (Fig. 4). The assembly is driven by means of a fluid operated cylinder 960 which is mounted horizontally on top piece 884 of the frame.

To one end of the piston rod of cylinder 960 is connected a flexible link member, e.g. chain 962, which is mounted about the periphery of a wheel, e.g. sprocket 964.

Sprocket 964 is keyed to a shaft 966 journaled in bearings 968 mounted on top pieces 884. The stroke of the piston rod of cylinder 960 is such that chain 962 rotates sprocket 964, and hence shaft 966, through a restricted arc, for example, one of about 180°.

Keyed to shaft 966 are a pair of sprockets 970 which preferably are of substantial size relative to sprocket 964. Chains 972 are mounted on these sprockets with their respective ends attached thereto at points which are substantially at 180° from each other.

Chains 972 engage idler sprockets 974 keyed to shaft 976 which are journaled in bearings 978. The lower ends of the chains are attached to the cross pieces 892 of the rack assembly.

Chains 972 thus support the weight of the racks, which may be reciprocated between raised and lowered stations upon reciprocation of the piston rod of cylinder 960, the extent of raising and lowering of the racks being determined by such factors as the stroke of the piston rod and the relative diameters of sprockets 964, 970. Sprockets 952 on the outfeed ends of the racks thus are brought alternately into engagement with wide sprocket 950 on the press loader conveyor frame.

The herein described outfeed jump conveyor also carries means for transferring the work units from the prepress 68 to one or the other of the racks of the jump conveyor assembly. In the illustrated embodiment, the loading means comprises pulling assemblies, one for each rack, mounted on trolley supports and reciprocated in horizontal planes for engaging the work units and pulling them out of the prepress in the outfeed direction, and for loading them on the jump conveyor.

Where the work units comprise fibrous mats superimposed upon metal caul plates, this operation is facilitated by the provision on the leading ends of the caul plates of recessed, outwardly projecting tongues or T hooks 980. The loading assemblies for the upper and lower racks are substantially identical, with the exception that they are reversed in position, being substantially mirror images of each other. This is particularly apparent from a consideration of Fig. 4.

Thus each loading assembly is mounted on a pair of longitudinally extending tracks 984 which may comprise outwardly directed channel irons welded to cross pieces 882. It is driven from a reversible hydraulic motor 986, the shaft of which drives worm gears 988 which in turn rotate shaft 990. Shaft 990 is journaled in bearings 991 and mounts a sprocket 992 which engages and drives a discontinuous chain 994 extending the length of the apparatus between tracks 984. Chain 994 engages an idler sprocket 996 rotatably mounted at the other (infeed) end of tracks 984.

The respective ends of discontinuous chain 994 are fastened to and drive the work unit loading assembly (Figs. 8, 9). This assembly is mounted upon a trolley indicated generally at 1000. It includes side plates 1002 and a back plate 1004 welded to a stepped base plate 1006.

A standard 1008 is mounted on the raised portion of base plate 1006. One end of chain 994 is anchored to this standard. The other end passes over an idler sprocket 1010 rotatably mounted on a shaft carried by a standard 1012 projecting upwardly from the depressed portion of the base plate. It then is attached to a tightening bolt 1014 extending through the base plate.

Wheels 1016 are rotatably mounted on shafts extending inwardly from side plates 1002. These wheels are arranged to engage the inner surfaces of the upper and lower flanges of channel iron tracks 984. Accordingly, by operation of reversible hydraulic motor 986, the loading assembly may be reciprocated between a retracted position in which it lies at the infeed end of the jump conveyor adjacent the work units on prepress 68, and an advanced position in which it lies at the outfeed end of the jump conveyor adjacent the press loader 74.

Work gripping means are mounted on the trolley for gripping the work when the trolley is in its retracted position and for pulling it onto conveyor belts 916 of the jump conveyor assembly.

The gripping means is driven by a cylinder 1020 bolted to the outside of base plate 1006. The head of the piston rod of this cylinder carries a short shaft 1022. The ends of links 1024, 1026 are journaled on this shaft in overlapped relation in the manner particularly evident in Fig. 8. The other ends of links 1024 are journaled on pin 1028, while the other ends of links 1026 are journaled on pin 1030. Coil springs 1031 interconnect links 1024, 1026 and the frame of the trolley.

Spacers 1032 separate the links, which are connected through pin 1030 to a pair of triangular, overlapped plates 1034, 1036.

Plate 1034 is welded to a sleeve 1038 while plate 1036 is welded to a corresponding sleeve 1040. Both sleeves are rotatably mounted on a vertical post 1042 which penetrates the stepped portion of trolley base plate 1006. Both are maintained in position by collar 1044 at the base of the post. The post, in turn, is stabilized by sleeve 1046 and web member 1048 which connects the latter sleeve to the frame.

As is apparent, overlapped plates 1034, 1036 are vertically offset from each other by a small amount. Accordingly, they carry at their outer ends fingers 1050, 1052 which are of slightly different lengths to compensate for this factor. These fingers are dimensioned to be received in the recesses of recessed tongues 980 on the caul plates.

The manner of operation of the outfeed jump conveyor of the herein described mat handling apparatus is as follows:

After a work unit has been consolidated in prepress 68, cylinder 1020 is operated to close together plates 1034, 1036 until fingers 1050, 1052 thereon engage the recessed tongues 980 on the caul plates.

Hydraulic motor 986 then is energized, advancing trolley 1000. This pulls the work unit onto conveyor belts 916.

Cylinder 960 then is operated to raise or lower the rack carrying the conveyor belts as required to register the latter with conveyor belts 940 of the press loader conveyor or other operating unit following the jump conveyor. This movement meshes sprocket 952 on the shaft of conveyor belts 916 and continuously driven sprocket 950 on the press loader conveyor. Accordingly belts 916 are driven in the outfeed direction, the work units thereupon being transferred to belts 940 of the edge press.

Operation

The overall operation of the herein described mat handling apparatus is as follows:

Assuming that the infeed jump conveyor 64 is in the elevated position illustrated in Fig. 1, a first work unit which may comprise a lignocellulose mat resting on a metal caul plate is ejected from a high capacity felter 60 and placed on the lower unit of the infeed jump conveyor. There it is located precisely by the operation of impeller 62.

The jump conveyor then is indexed downwardly to its dotted line position and the work unit transferred to edge press 66. While this is occurring a second work unit is ejected from felter 60 onto the upper deck of the jump conveyor.

The jump conveyor then is indexed upwardly until the upper level thereof registers with the upper level of edge press 66 so that the work unit may be transferred thereto. The jump conveyor thus shuttles back and forth between its raised and lowered positions, receiving work units from felter 60 and delivering them alternately to the upper and lower levels of the edge press.

After the first work unit has had its leading edge consolidated in edge press 66, it is transferred to prepress 68. A following work unit thereupon is located on edge press 66. The balance of the first unit is consolidated in the prepress while the leading edge of the following unit is pressed in the edge press. While the two work units are confined in the prepress and edge press respectively, trim saws 70 trim off the trailing edge of the first unit and the leading edge of the following unit.

Outfeed jump conveyor 72 is indexed to its down position and the first work unit drawn into it by means of trolley 1000. While the next work unit is following the first into prepress 68, the outfeed jump conveyor is indexed ot its raised full line position whereupon drive sprocket 952 of its lower conveyor level meshes with continuously moving drive sprocket 950 of the press loader conveyor. Thereupon the first work unit is transferred from the outfeed jump conveyor into the press loader conveyor whence it passes to a hot press for final consolidation.

While the foregoing sequence is occurring, a similar sequence is occurring in the upper decks of the various units of the apparatus with the result that the stream of work units emanating from felter 60 is divided into two lines by infeed jump conveyor 64 and, after representing and trimming, the two lines are re-united in a single line by outfeed jump conveyor 72 which delivers them to the press loader conveyor.

The sequence thus is repeated continuously to provide a rapid and effective procedure for handling compactable mats. This procedure has the advantages of providing prepressed mats which are self-sustaining and may be handled without danger of breakage in subsequent operations. Furthermore, the leading edges, trailing edges and side edges of the mats all are sharply defined and uniform so that consolidated products made therefrom likewise will have sharply defined uniform edges.

Since a trimming operation is carried out on the mats before their consolidation, the unused trim may be collected and recycled without loss for fabrication into further mats. This is not possible if the mats are trimmed after hot pressing, and effectuates a substantial saving of raw material.

Since the leading edges of the mats are prepressed in an edge press in a preliminary operation, the mats may be introduced into the prepress with little danger of pieces of material working under the caul plates and hence with little danger of denting the latter upon operation of the prepress. Also, the method and apparatus are versatile and adaptable to handling mats of varying length, width and thickness, produced by a felter or other apparatus of high capacity.

It is to be understood that the form of our invention herewith shown and described is to be taken as a preferred example of the same, and that various changes in the shape, size and arrangement of parts may be resorted to without departing from the spirit of our invention or the scope of the subjoined claims.

This application is a division of application Serial No. 647,589, filed March 21, 1957.

Having thus described our invention, we claim:

1. A conveyor for dividing an incoming line of spaced apart work units into two outgoing lines progressing at two different elevations, said conveyor comprising: a pair of vertically spaced apart work-unit receiving racks; means for mounting the racks for vertical reciprocation between a first station wherein the lower rack is in position for receiving a work unit from the incoming line and the upper rack is in position for discharging a work unit into the upper outgoing line, and a second station wherein the upper rack is in position for receiving a work unit from the incoming line and the lower rack is in position for discharging a work unit onto the lower outgoing line; drive means connected to the racks for reciprocating them substantially synchronously between the two stations; and discharging means positioned at each station for discharging the work units from the racks.

2. The conveyor of claim 1 wherein the racks comprise a frame and two vertically spaced apart, horizontal sets of rollers rotatably mounted on the frame for receiving the work units.

3. The conveyor of claim 1 wherein the drive means employed for reciprocating the racks between their two stations comprises a fluid operated cylinder, a first flexible link member having one of its ends connected to the piston rod of the cylinder, a first wheel, the flexible link member being mounted on the wheel periphery with its other end pinned thereto, a second wheel rigid to the first wheel, and a second flexible link member mounted on the periphery of the second wheel with one of its ends pinned thereto and the other of its ends attached to the rack for securing reciprocation of the same with reciprocation of the piston rod of the fluid operated cylinder.

4. A jump conveyor for consolidating two incoming lines of work units progressing at two different elevations into an outgoing line at a single elevation, said conveyor comprising: a pair of vertically spaced apart work-unit receiving racks; means for mounting the racks for vertical reciprocation between a first station wherein the upper rack is in position for receiving a work unit from the upper incoming line and the lower rack is in position for discharging a work unit into the outgoing line, and a second station wherein the upper rack is in position for discharging a work unit into the outgoing line and the lower rack is in position for receiving a work unit from the lower incoming line; drive means for reciprocating the racks substantially synchronously between the two stations; and discharging means for discharging the work units from the racks onto the outgoing line.

5. The conveyor of claim 4 wherein the racks and the outfeed conveying line are provided with endless conveyors and the discharging means comprises motor driven gear means provided on both conveyors for interengagement when the racks are placed in their respective stations.

References Cited in the file of this patent
UNITED STATES PATENTS

| | | |
|---|---|---|
| 2,020,552 | Hills | Nov. 12, 1935 |
| 2,058,729 | Sekulski | Oct. 27, 1936 |